United States Patent
Yamaguchi et al.

(10) Patent No.: US 10,260,889 B2
(45) Date of Patent: Apr. 16, 2019

(54) POSITION ESTIMATION DEVICE AND POSITION ESTIMATION METHOD

(71) Applicant: Nissan Motor Co., Ltd., Yokohama-shi, Kanagawa (JP)

(72) Inventors: Ichiro Yamaguchi, Kanagawa (JP); Hirotoshi Ueda, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/577,156

(22) PCT Filed: May 28, 2015

(86) PCT No.: PCT/JP2015/065415
§ 371 (c)(1),
(2) Date: Nov. 27, 2017

(87) PCT Pub. No.: WO2016/189732
PCT Pub. Date: Dec. 1, 2016

(65) Prior Publication Data
US 2018/0172455 A1 Jun. 21, 2018

(51) Int. Cl.
*G01C 21/30* (2006.01)
*G01C 21/32* (2006.01)
(Continued)

(52) U.S. Cl.
CPC .......... *G01C 21/30* (2013.01); *G01C 21/005* (2013.01); *G01C 21/3602* (2013.01); *G01C 21/3644* (2013.01); *G05D 1/02* (2013.01)

(58) Field of Classification Search
CPC .............. G01C 21/005; G01C 21/3602; G01C 21/3644; G01C 21/30; G01C 21/32; G05D 1/02
See application file for complete search history.

(56) References Cited

U.S. PATENT DOCUMENTS 3,898,655 A * 8/1975 Tresselt ................ G01S 13/348
342/112
6,023,653 A 2/2000 Ichimura et al.
(Continued)

FOREIGN PATENT DOCUMENTS

ES 2138016 * 1/2000 ............ B25J 13/089
JP H08247775 A 9/1996
(Continued)

*Primary Examiner* — Adam D Tissot
*Assistant Examiner* — Aaron C Smith
(74) *Attorney, Agent, or Firm* — Young Basile Hanlon & MacFarlane, P.C.

(57) ABSTRACT

An own position estimation device detects a landmark position of a landmark existing around a mobile body, detects a movement amount of the mobile body, and accumulates, as pieces of landmark position data, landmark positions each obtained by moving the detected landmark position by the movement amount. The device then acquires map information including landmark positions of landmarks existing on a map by the controller, matches the pieces of landmark position data in a certain range with the landmark positions included in the map information, and estimates the own position of the mobile body, the certain range being set based on movement records of the mobile body traveling to a current position.

9 Claims, 16 Drawing Sheets

(51) Int. Cl.
   *G05D 1/02* (2006.01)
   *G01C 21/00* (2006.01)
   *G01C 21/36* (2006.01)

(56) References Cited

U.S. PATENT DOCUMENTS

| | | | |
|---|---|---|---|
| 2010/0061591 A1 | 3/2010 | Okada et al. | |
| 2014/0214271 A1* | 7/2014 | Choi | B60R 1/002 701/36 |
| 2016/0169683 A1* | 6/2016 | Lynch | G01C 21/26 701/409 |

FOREIGN PATENT DOCUMENTS

| | | |
|---|---|---|
| JP | H09152344 A | 6/1997 |
| JP | 2007309757 A | 11/2007 |
| JP | 2008250906 A | 10/2008 |

* cited by examiner

POSITION ESTIMATION DEVICE AND POSITION ESTIMATION METHOD

TECHNICAL FIELD

The present invention relates to own position estimation device and method which estimate an own position of a mobile body.

BACKGROUND

A technique of estimating the own position of a mobile body has been developed which includes: sensing surroundings of the mobile body with a camera and a laser rangefinder mounted in the mobile body; and acquiring the position on a map and an attitude angle of the mobile body by matching the sensing results with the map. A conventional example of this technique is disclosed in Japanese Patent Application Publication No. 2008-250906.

In the own position estimation technique of Japanese Patent Application Publication No. 2008-250906, past records of sensing results and movement amounts calculated by using wheel speed pulses, a gyroscope, and the like are accumulated in association with each other, and the position and the attitude angle of the mobile body are estimated with adjustment made such that the accumulated data and the map match each other. Moreover, in the own position estimation technique of Japanese Patent Application Publication No. 2008-250906, use of the records of sensing results acquired within a fixed distance at all times enables stable estimation of the own position of the mobile body by eliminating influence of the movement speed of the mobile body.

In the conventional own position estimation technique described above, however, the use of the records of sensing results acquired within the fixed distance poses a problem that, in a situation where a detection error in the movement amount increases, deviation between the sensing results and the map increases so much that the estimation of the own position becomes difficult.

SUMMARY

The present invention has been proposed in view of the circumstances described above, and an object thereof is to provide own position estimation device and method which can stably estimate an own position with high accuracy even in a situation where a movement amount detection error increases.

To solve the above problem, an own position estimation device and an own position estimation method in accordance with some embodiments of the present invention detect a landmark position of a landmark existing around a mobile body and detect a movement amount of the mobile body. Then, the device and method accumulate, as pieces of landmark position data, landmark positions each obtained by moving the detected landmark position by the movement amount and acquire map information including landmark positions of landmarks existing on a map by the controller. Then, the device and method match the pieces of landmark position data in a certain range with the landmark positions included in the map information and estimate the own position of the mobile body, the certain range being set based on movement records of the mobile body traveling to a current position.

DETAILED DESCRIPTION OF THE EMBODIMENTS

First and second embodiments to which the present invention is applied are described below with reference to the drawings.

First Embodiment (Configuration of Own Position Estimation System)

Figure 1:
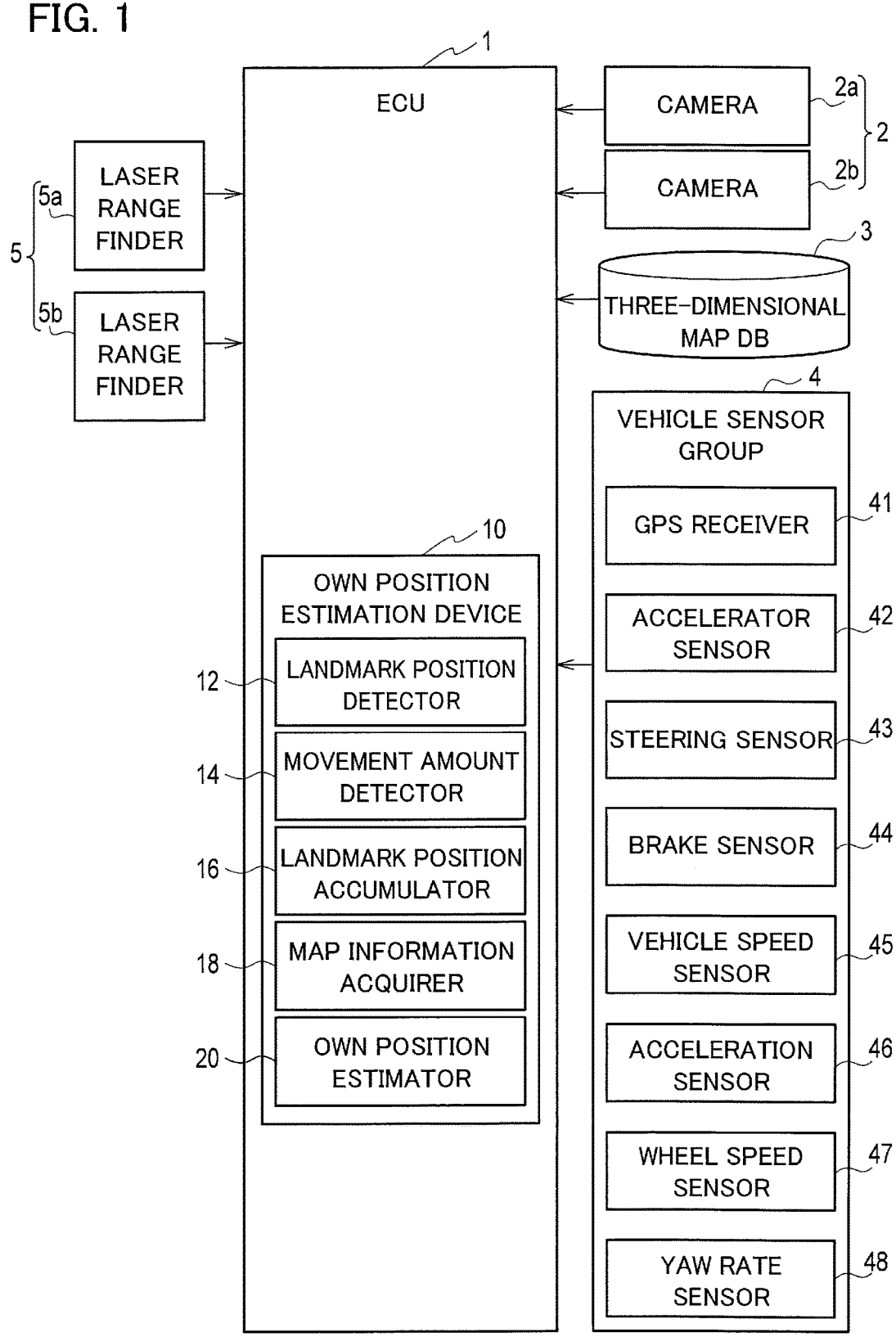
FIG. 1 is a block diagram illustrating a configuration of an own position estimation system including an own position estimation device according to a first embodiment of the present invention.

FIG. 1 is a block diagram illustrating a configuration of an own position estimation system including an own position estimation device according to the embodiment. As illustrated in FIG. 1, the own position estimation system according to the embodiment includes a ECU 1, cameras 2, a three-dimensional map database 3, a vehicle sensor group 4, and laser rangefinders 5.

Here, the ECU 1 is an electronic control unit including a ROM, a RAM, a computation circuit, and the like. A program for implementing the own position estimation device 10 according to the embodiment is stored in the ROM. Note that the ECU 1 may also serve as an ECU used for other controls.

Figure 2:
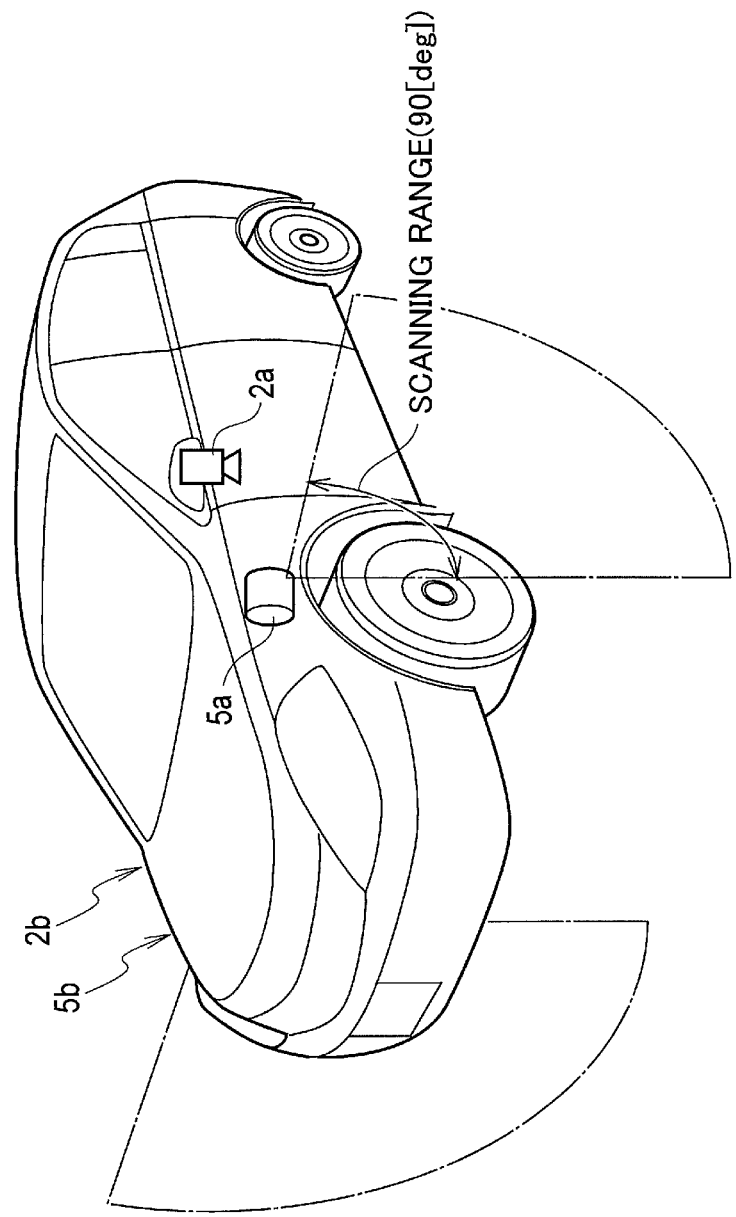
FIG. 2 is a view illustrating mounting positions of laser rangefinders and cameras in a vehicle.

The cameras 2 (2a, 2b) are cameras using solid-state imaging elements such as CCDs. The cameras 2 are installed in, for example, right and left door mirrors of a vehicle as illustrated in FIG. 2 and are aimed in such directions that the cameras 2 can capture images of road surfaces below the vehicle. The captured images are sent to the ECU 1.

The three-dimensional map database 3 is storage means for storing map information including landmark positions of landmarks existing on a map, and stores three-dimensional position information on a surrounding environment including, for example, road display. The landmarks recorded in the map information are landmarks registered in the map and includes road surface signs such as section lines, stop lines, pedestrian crossings, and road surface marks, in addition to buildings, structures, and the like on road surfaces such as curbs. Pieces of map information such as white lines are defined as a collection of edges. When an edge is a long straight line, the edge is divided, for example, every 1 m, and there is thus no extremely long edge. When an edge is a straight line, the edge has three-dimensional position information indicating both end points of the straight line. When an edge is a curved line, the edge has three-dimensional position information indicating both end points and a center point of the curved line. Moreover, since the three-dimensional map database 3 stores node-link information included in a general navigation system, the ECU 1 can perform processing of a route guidance to a destination and recording of a past travel route.

The vehicle sensor group 4 includes a GPS receiver 41, an accelerator sensor 42, a steering sensor 43, a brake sensor 44, a vehicle speed sensor 45, an acceleration sensor 46, a wheel speed sensor 47, and a yaw rate sensor 48. The vehicle sensor group 4 is connected to the ECU 1 and supplies various detection values detected by the sensors 41 to 48 to the ECU 1. The ECU 1 uses the output values of the vehicle sensor group 4 to calculate the rough position of the vehicle and calculate odometry indicating the movement amount of the vehicle in a unit time.

The laser rangefinders 5 (5a, 5b) are attached to be capable of performing scanning in directions to the left and right of the vehicle body as illustrated in FIG. 2. The laser rangefinders 5 emit 900×2=1800 laser beams in directions perpendicular to a traveling direction at intervals of 0.1 [deg] each over a scanning range of 90 [deg] from a directly downward direction to a horizontal direction. The laser rangefinders 5 can thereby detect distances $\varepsilon i$ [m] (i=1 to 1800) to the road surface and obstacles as well as intensities $\varepsilon i$ (i=1 to 1800, $0 \le \varepsilon i \le 255$) of reflected waves.

The own position estimation device 10 functions as a controller which executes own position estimation processing and estimates the position and attitude angle of the vehicle by matching the landmark positions of landmarks existing around the vehicle with the map information stored in the three-dimensional map database 3. The own position estimation device 10 executes a program for own position estimation stored in the ROM and operates as a landmark position detector 12, a movement amount detector 14, a landmark position accumulator 16, a map information acquirer 18, and an own position estimator 20.

The landmark position detector 12 detects the landmark positions of the landmarks existing around the vehicle from scan results of the laser rangefinders 5. Moreover, the landmark position detector 12 may detect the landmark positions from images acquired by the cameras 2 or detect the landmark positions by using both of the cameras 2 and the laser rangefinders 5.

The movement amount detector 14 detects the odometry which is the movement amount of the vehicle, based on the information from the vehicle sensor group 4 mounted in the vehicle.

The landmark position accumulator 16 accumulates, as pieces of landmark position data, landmark positions obtained by moving the landmark positions, detected by the landmark position detector 12 in control cycles executed in the past, by a movement amount detected by the movement amount detector 14.

The map information acquirer 18 acquires the map information from the three-dimensional map database 3 and the acquired map information includes landmark positions of landmarks existing on the map.

In the embodiment, the own position estimator 20 estimates a detection error in the movement amount detected by the movement amount detector 14, based on a change in the past movement amount in travel records of the vehicle (corresponding to a movement records of a mobile body). Then, the own position estimator 20 sets a certain range (extraction range A to be described later) over which the pieces of landmark position data are to be extracted from the landmark position accumulator 16, based on the movement amount detection error estimated from the change in the past movement amount in the travel records of the vehicle, extracts the pieces of landmark position data included in the certain range (extraction range A) set based on the travel records of vehicle, from the pieces of landmark position data accumulated in the landmark position accumulator 16, and matches the extracted pieces of landmark position data with the landmark positions included in the map information to estimate the own position of the vehicle.

Although the case where the present invention is applied to the vehicle is described in this embodiment, the present invention can be applied also to mobile bodies such as aircraft and ships. When the present invention is applied to aircraft and ships, the own position of the mobile body can be estimated by matching landscapes and buildings as a surrounding environment, instead of information related to road signs.

(Steps in Own Position Estimation Processing)

Next, steps in the own position estimation processing according to the embodiment are described with reference to the flowchart of FIG. 3. Note that, in the embodiment, two coordinate systems illustrated in FIG. 4 are used when the own position of the vehicle is estimated. Specifically, the two coordinate systems are an absolute coordinate system whose center is at an original point of the map information and a relative space coordinate system whose original point is at the center of a rear axle of the vehicle. In the absolute coordinate system, the original point of the map information is set as an original point O, an east-west direction is set as an X-axis, a north-south direction is set as a Y-axis, and a vertically upward direction is set as a Z-axis. In the absolute coordinate system, an azimuth angle (yaw angle) $\theta$ [rad] being the heading of the vehicle is expressed by a counter-clockwise angle where 0 is the eastward direction (X-axis direction). Moreover, in the relative space coordinate system, the center of the rear axle of the vehicle is set as an original point o, a front-rear direction of the vehicle is set as an x-axis, a vehicle width direction is set as a y-axis, and a vertically upward direction is set as a z-axis.

Note that, in the embodiment, there are estimated the position and attitude angle with a total of three degrees of freedom including: the position (X coordinate [m]) in the east-west direction (X-axis direction) and the position (Y coordinate [m]) in the north-south direction (Y-axis direction) which are the estimated own position of the vehicle; and the azimuth angle θ (yaw angle [rad]) of the vehicle which is attitude angle information of the vehicle. However, position and attitude angles in a space with six degrees of freedom can be acquired instead of the position and attitude angle with three degrees of freedom. Moreover, the own position estimation processing described below is performed consecutively at intervals of, for example, about 100 msec.

Figure 3:
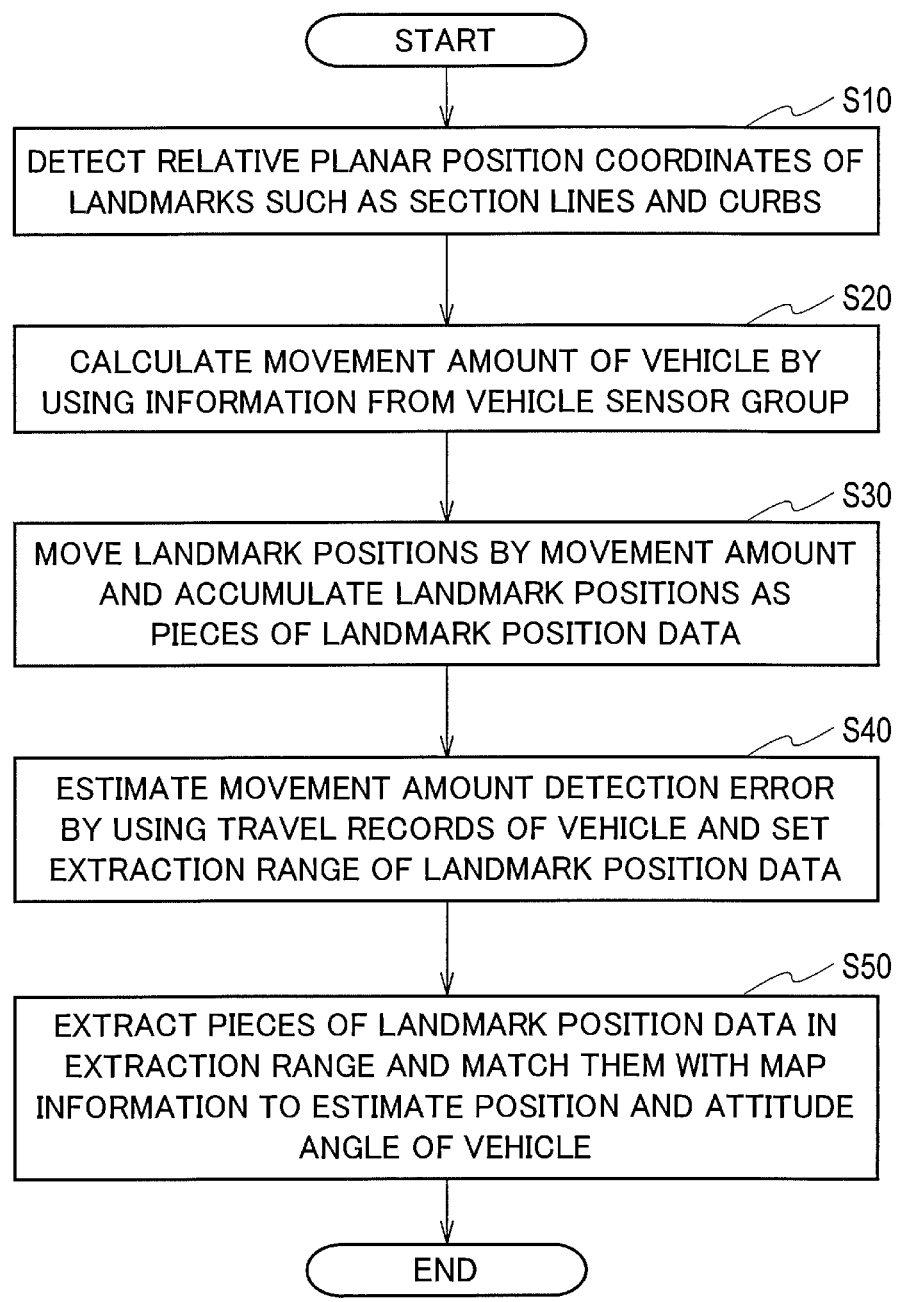
FIG. 3 is a flowchart illustrating processing steps in own position estimation processing by the own position estimation device according to the first embodiment of the present invention.
Figure 4:
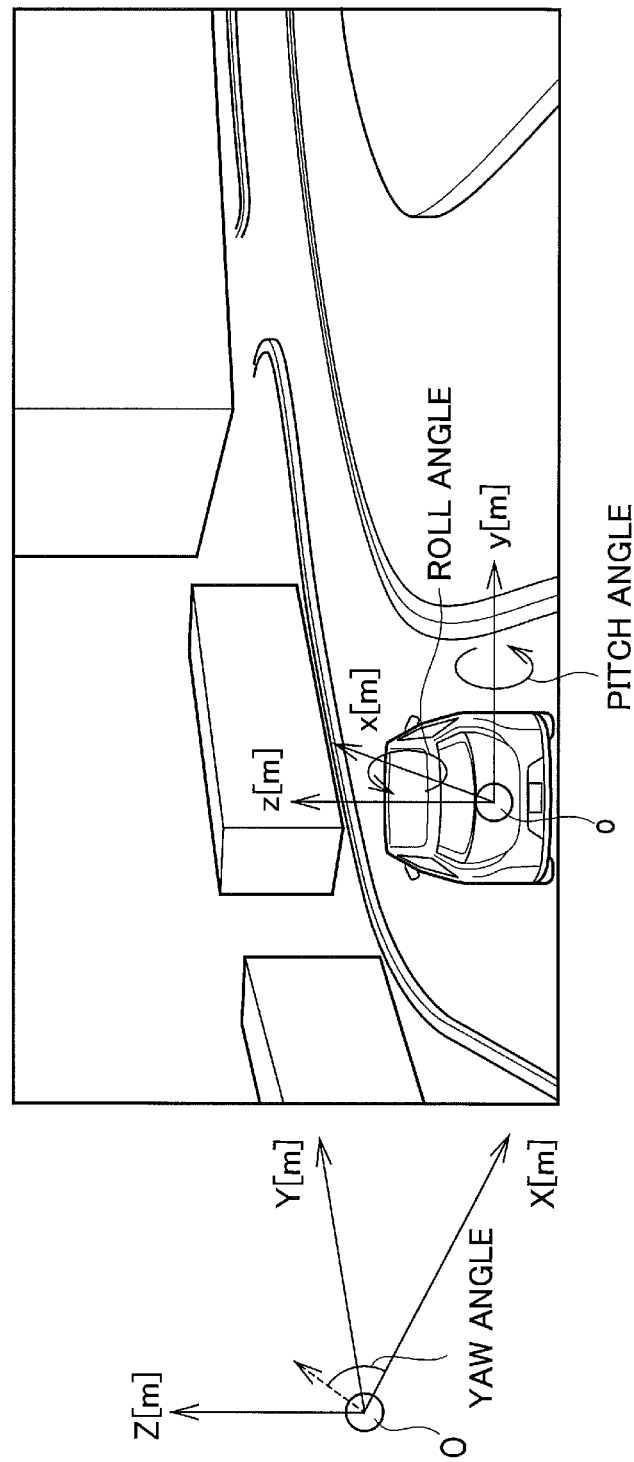
FIG. 4 is a view for explaining coordinate systems employed in the own position estimation device according to the first embodiment of the present invention.

As illustrated in FIG. 3, first, in step S10, the landmark position detector 12 detects the landmark positions of the landmarks existing around the vehicle. Specifically, the landmark position detector 12 acquires the scan results of the laser rangefinders 5 and extracts the landmark positions of road surface signs such as section lines and stop lines and structures such as curbs and buildings. The landmark positions extracted herein each have relative planar position coordinates $(x_j(t), y_j(t))$ [m] relative to the vehicle in the relative space coordinate system. Note that j in $x_j$, $y_j$ are equal to the number of the road surface signs and curbs which are extracted. Moreover, t expresses the current time point (cycle).

A method of acquiring the relative planar position coordinates of a road surface sign is as follows. When the intensity δi of a reflected wave of an emitted laser beam reaches or exceeds a threshold δth, the landmark position detector 12 determines that the laser beam is casted on a road surface sign, and acquires the relative planar position coordinates by using the distance εi from the host vehicle to a point where the laser beam is casted and the angle of the laser beam. The relative planar position coordinates can be acquired in this method because a road surface sign portion of the road surface contains a large amount of reflecting material and reflects the laser beam at a higher intensity than an asphalt portion of the road surface. Moreover, the threshold δth may be acquired in advance through experiments and the like and stored in the ECU 1. In the embodiment, the threshold δth is set to 120.

Figure 5A:
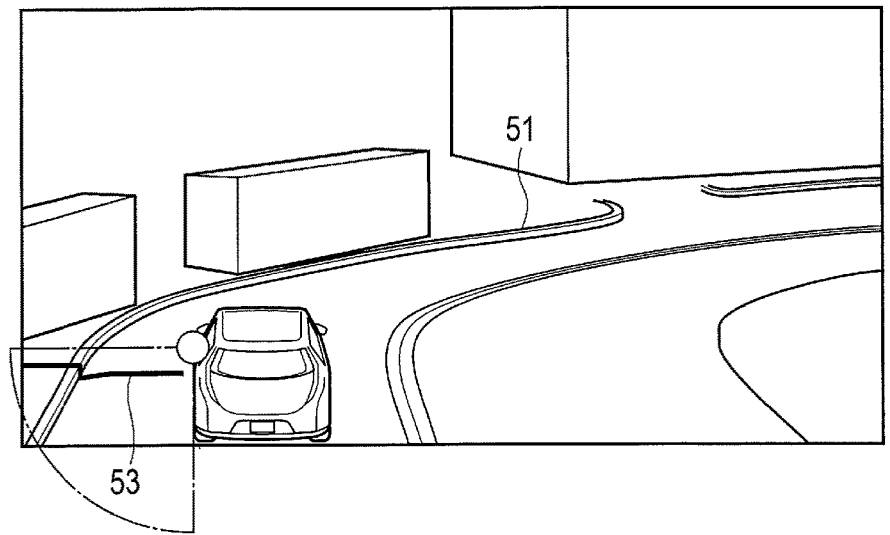
FIGS. 5A and 5B are views explaining a detection method by the laser rangefinder in the own position estimation device according to the first embodiment of the present invention.
Figure 5B:
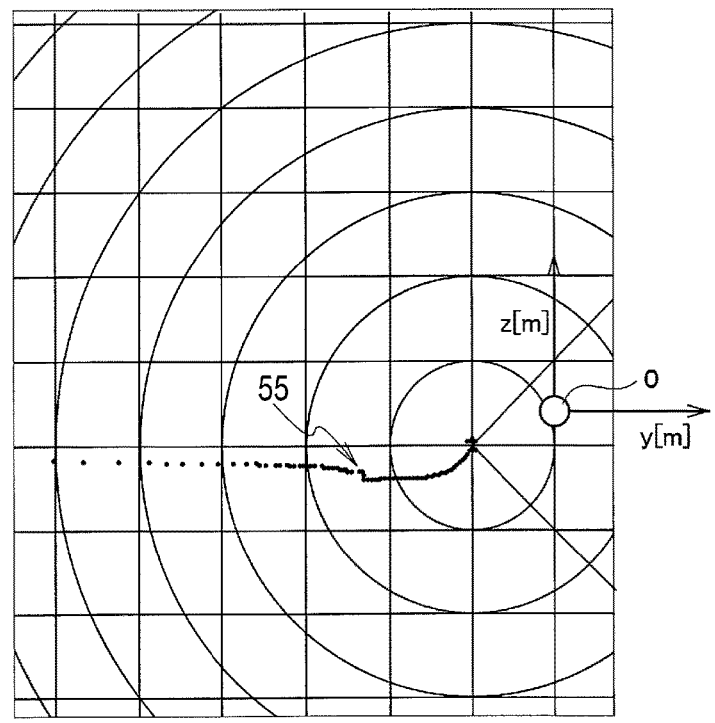

Regarding a method of acquiring the landmark positions of structures such as curbs and buildings, the relative planar position coordinates $(x_j(t), y_j(t))$ of each point where the laser beam is casted are calculated and acquired by using the distance εi to the point where the laser beam is casted and the angle of the laser beam. Specifically, for example, in a situation illustrated in FIG. 5A, when the laser rangefinder 5 emits laser beams, the laser beams are casted on a road surface including a curb 51 as illustrated by a line 53. When a point group of the laser beams emitted as described above is detected, as illustrated in FIG. 5B, a portion 55 of a great change is detected. A portion where the tilt of the point group greatly changes is extracted from the detected point group by using a segment detection method such as Hough transform, and the relative planar position coordinates $(x_j(t), y_j(t))$ of this portion are calculated. Also in the case where the structure on the road surface is a building, the relative planar position coordinates $(x_j(t), y_j(t))$ can be acquired in a similar way by extracting the portion where the tilt of the point group greatly changes.

Figure 6A:
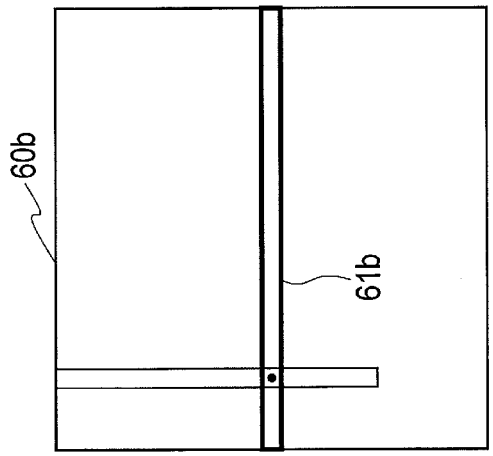
FIGS. 6A-6C are views for explaining a method of detecting a white line with the camera in the own position estimation device according to the first embodiment of the present invention.
Figure 6C:
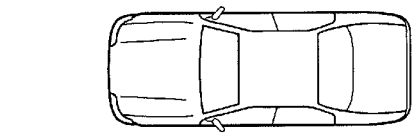
Figure 6C:
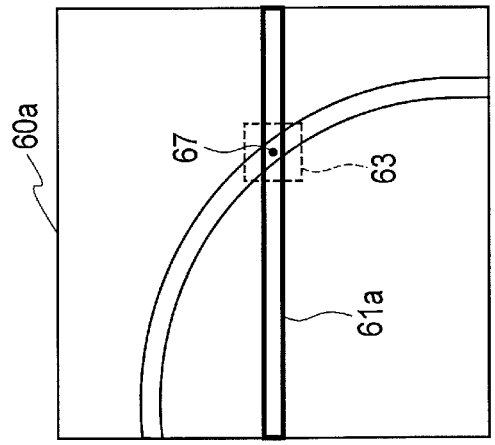
Figure 6C:
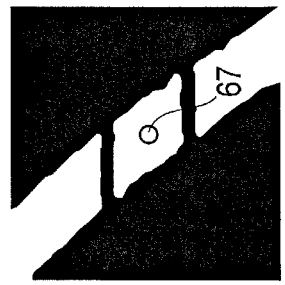
Figure 6B:
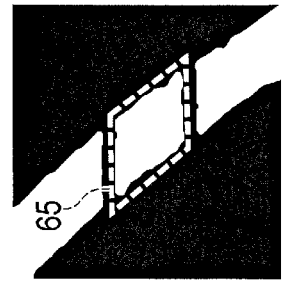

Moreover, in step S10, the landmark position detector 12 may acquire the images of the cameras 2 and extract the relative planar position coordinates $(x_j(t), y_j(t))$ of road signs such as section lines by using the images of the cameras 2. A method of extracting the relative planar position coordinates of road signs by using the images of the cameras 2 is described with reference to FIGS. 6A-6C. FIG. 6A illustrates an image 60a of the camera 2a capturing an image of a lower left portion of the vehicle and an image 60b of the camera 2b capturing an image of a lower right portion of the vehicle. In the images 60a, 60b, the landmark position detector 12 detects white lines in regions 61a, 61b. For example, the landmark position detector 12 performs binarization on the regions 61a, 61b to extract a region 63 with a high luminance value, and detects a portion 65 with a high luminance value as illustrated in FIG. 6B. Then, as illustrated in FIG. 6C, the landmark position detector 12 calculates the center of gravity 67 of the high-luminance value portion 65, and acquires the relative planar position coordinates $(x_j(t), y_j(t))$ of the center of gravity 67 by using internal parameters (camera model) and external parameters (vehicle attachment position of the camera 2) of the camera 2.

Note that, right after an engine of the vehicle is started or, in the case where the vehicle is an electric car, right after a power supply for drive is turned on, no scan results of the laser rangefinders 5 are accumulated. Accordingly, in the embodiment, when the engine of the vehicle is turned off or, in the case where the vehicle is the electric car, when the power supply for driving is turned off, the scan results in a later-described extraction range A [m] from the current position are extracted and recorded in the memory of the ECU 1 or a recording medium. Then, when the engine of the vehicle is started or, in the case where the vehicle is the electric car, when the power supply for drive is turned on, the recorded scan results are read.

Moreover, an operation of subjecting the relative planar position coordinates $(x_j(t), y_j(t))$ of the section lines, curbs, buildings, and the like extracted in step S10 to processing to be described later to record them as the relative planar position coordinates at the current time point t continues until the engine of the vehicle is turned off. When the vehicle is the electric car, recording of the relative planar position coordinates $(x_j(t), y_j(t))$ continues until the power supply for drive is turned off.

Next, in step S20, the movement amount detector 14 detects the odometry which is the movement amount of the vehicle in a period from a time point one cycle ago to the current time point t, based on the sensor information acquired from the vehicle sensor group 4. The odometry is the movement amount over which the vehicle has traveled in a unit time. For example, in the embodiment, regarding the movement amount of the yaw angle, the yaw rate y [rad/s] acquired from the yaw rate sensor 48 is multiplied by 100 msec which is a computation cycle of the ECU 1 to acquire a change amount $\Delta\theta$ (t) [rad] of the yaw angle. Moreover, regarding the movement amount in a translational direction, the vehicle speed V [m/s] acquired from the vehicle speed sensor 45 is multiplied by 100 msec which is the computation cycle of the ECU 1 to acquire a movement amount $\Delta L$ (t) [m] in the translational direction. Furthermore, the calculation of the odometry may be performed such that tire parameters of the wheels of the vehicle are measured and a sideslip angle of the vehicle body and a sideslip amount of the vehicle body are estimated and calculated by using a bicycle model or the like.

In step S30, the landmark position accumulator 16 moves the landmark positions detected by the landmark position detector 12 by the movement amount detected by the movement amount detector 14 and accumulates the landmark positions as the pieces of landmark position data. Specifically, the relative planar position coordinates (xj(t), yj(t)) of the landmarks such as the section lines and the curbs acquired in step S10 of the past cycles are moved by the amount of odometry acquired in step S20. In other words, the landmarks positions such as the section lines and the curbs acquired in the past by using one or both of the laser rangefinders 5 and the cameras 2 are converted to positions in the relative space coordinate system whose original point is the center of the rear axle of the vehicle at this moment, by using the odometry information.

Figure 7B:
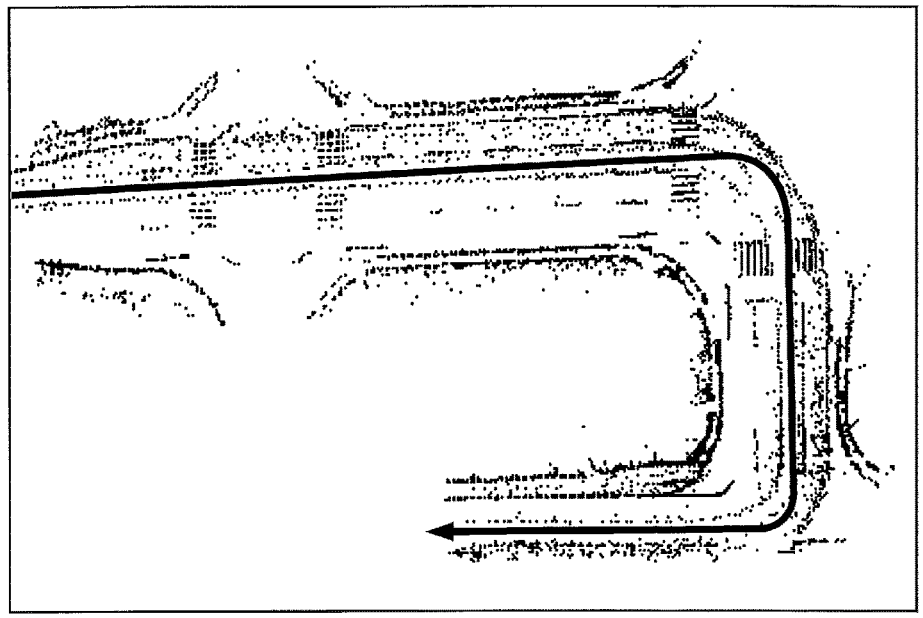
FIGS. 7A and 7B are views illustrating a result of detecting landmarks by the own position estimation device according to the first embodiment of the present invention.
Figure 7A:
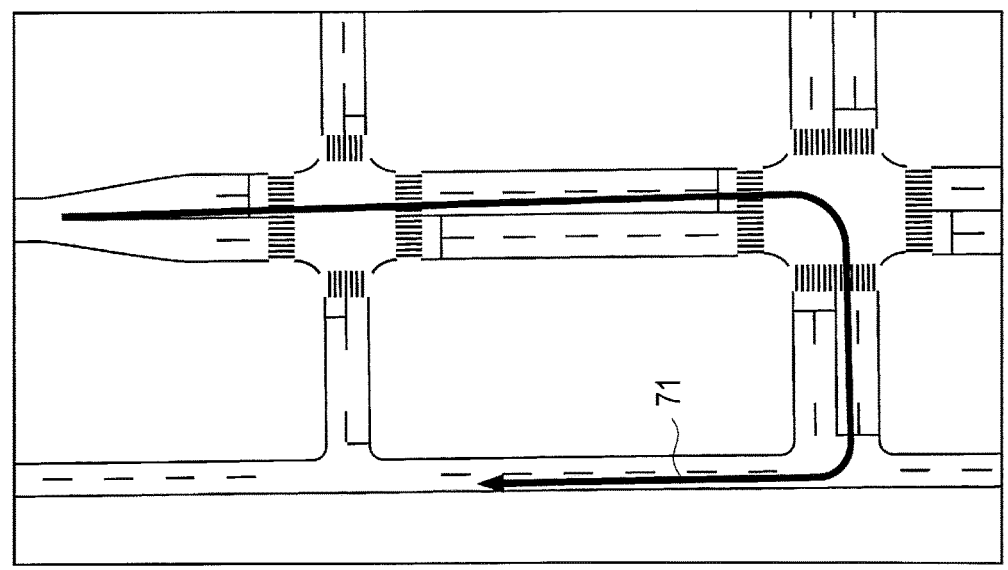

The positions of the landmarks can be thereby specified from the scan results of the laser rangefinders 5 as illustrated in, for example, FIG. 7B. FIG. 7B is a view illustrating the pieces of landmark position data accumulated when the vehicle travels along a route of an arrow 71 on a traveling road whose view from above is illustrated in FIG. 7A. Specifically, FIG. 7B is an example illustrating a result of moving pieces of position information of the landmarks detected by the laser rangefinders 5 in step S10 by the movement amount detected in step S20 and accumulating the pieces of position information. In FIG. 7B, there are displayed the positions of points on the road surface with high reflection intensity such as, for example, section lines, stop lines, and pedestrian crossings, as well as the positions of curbs where the results of laser detection change greatly.

In step S40, the own position estimator 20 estimates the movement amount detection error of the vehicle, based on the change in the past movement amount in the travel records of the vehicle and sets the certain range (extraction range A) over which the pieces of landmark position data are to be extracted from the landmark position accumulator 16, based on the estimated movement amount detection error. Particularly, in the embodiment, the movement amount detection error is estimated by using the change in the past movement amount in the travel records of the vehicle. Specific examples of the change in the past movement amount in the travel records of the vehicle used to estimate the movement amount detection error include the change in the past movement amounts at the current position of the vehicle and a position of the vehicle a certain time before the current time point or a position behind the current position by a predetermined distance.

Figure 8:
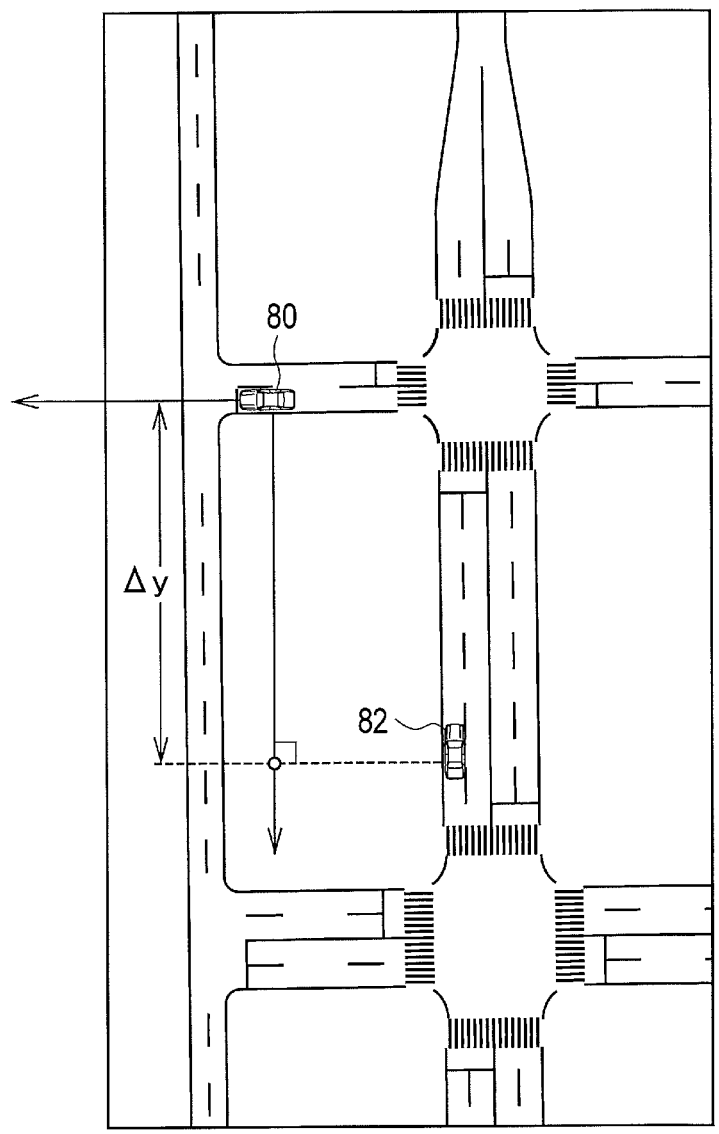
FIG. 8 is a view for explaining a method of estimating the movement amount detection error by the own position estimation device according to the first embodiment of the present invention.

As illustrated in FIG. 8, the own position estimator 20 compares the own position 80 (X(t), Y(t), θ(t)) of the vehicle calculated in step S50 of the preceding cycle with the own position 82 (X(t-T), Y(t-T), θ(t-T)) of the vehicle a time T [s] before the current time point and acquires a movement amount, by using the travel records. Note that the own position herein refers to the position in the east-west direction (X coordinate [m]), the position in the north-south direction (Y coordinate [m]), and the counterclockwise azimuth angle θ (yaw angle [rad]) in the absolute coordinate system, the azimuth angle θ being the attitude angle information where the eastward direction is 0.

In FIG. 8, the own position 82 of the vehicle the time T [s] before the current time point in the travel records has a change in the past movement amount which is shifted by an absolute value Δy [m] in the vehicle width direction as viewed from the vehicle at the current own position 80. When the absolute value Δy [m] of the shift amount which is the change in the past movement amount in the vehicle width direction is a threshold yth[m] or more, the own position estimator 20 can estimate that the movement amount detection error is large. Meanwhile, when the absolute value Δy [m] of the shift amount which is the change in the past movement amount in the vehicle width direction is less than the threshold yth[m], the own position estimator 20 can estimate that the movement amount detection error is small.

Moving of the vehicle in the vehicle width direction as illustrated in FIG. 8 can be considered that the vehicle has performed turning, lane changes, right or left turns, or travel along a curved road which involves a large movement amount change and thus tends to cause accumulation of odometry errors. Accordingly, the own position estimator 20 can estimate that the movement amount detection error is large.

Figure 9:
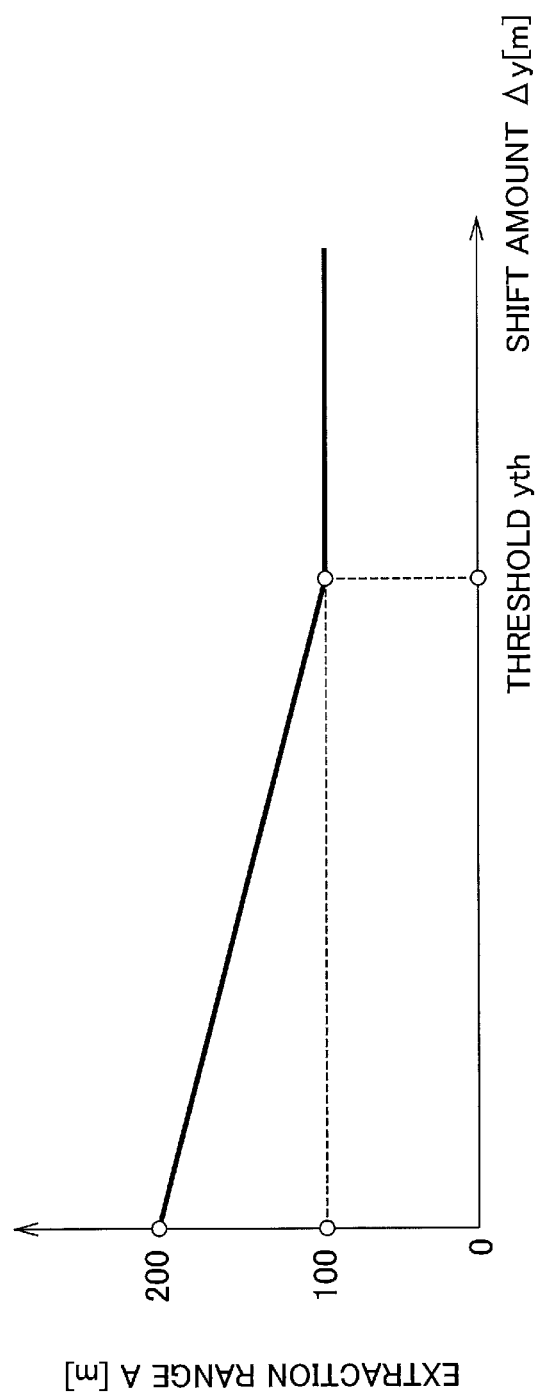
FIG. 9 is a view for explaining a method of setting an extraction range by the own position estimation device according to the first embodiment of the present invention.

When the own position estimator 20 estimates that the movement amount detection error is small by using the change in the past movement amount in the travel records, the own position estimator 20 increases the extraction range A [m] over which the pieces of landmark position data are to be extracted in step S50 to be described later, and sets it to, for example, 200 m. Meanwhile, when the own position estimator 20 estimates that the movement amount detection error is large by using the change in the past movement amount in the travel records, the own position estimator 20 reduces the extraction range A [m] and sets it to, for example, 100 m. Moreover, as illustrated in FIG. 9, the own position estimator 20 may change the extraction range A such that the extraction range A becomes continuously smaller as the shift amount Δy being the change in the past movement amount becomes larger. In other words, the extraction range A is set to become smaller as the movement amount detection error estimated by using the change in the past movement amount in the travel records becomes larger. When the movement amount detection error is estimated to be large by using the change in the past movement amount in the travel records as described above, the accumulation of errors in odometry is reduced by reducing the extraction range A.

Note that the threshold yth may be set to, for example, 50 m. Moreover, a reduction amount of the extraction range A is set to an appropriate value by studying a matching state in step S50 in advance through experiments and simulations, and may be set to values other than a value which reduces the extraction range A from 200 m to 100 m.

Moreover, the own position estimator 20 may estimate the change in the past movement amount by using, as the travel records, not only the movement amount in the vehicle width direction but also the number of crossings which the vehicle has passed, and estimate the size of the movement amount detection error. In this case, the extraction range A is first set to 200 m, and the number of times the vehicle has passed crossings in the extraction range A is counted as the travel records, by using the link-node information registered in the three-dimensional map database 3.

When the number of times the vehicle has passed the crossings in the travel records is less than three, the change in the past movement amount is small and thus the own position estimator 20 estimates that the movement amount detection error is small, and leaves the extraction range A as it is, which is 200 m. Meanwhile, when the number of times the vehicle has passed the crossings in the travel records is three or more, the change in the past movement amount is large and thus the own position estimator 20 estimates that the movement amount detection error is large, and sets the extraction range A to 100 m. In addition, the own position estimator 20 may perform operations as follows. The own position estimator 20 searches the maximum gradient on the map in the extraction range A. For example, when a section with the maximum gradient of 4% or more is included as the travel records, the change in the past movement amount is large and thus the own position estimator 20 estimates that the movement amount detection error is large, and sets the extraction range A to 100 m.

As described above, the own position estimator 20 may estimate the change in the past movement amount by referring not only to the current position of the vehicle and the position of the vehicle the predetermined time before the current time point but also to the map information on the travel route of the vehicle as the travel records, and estimate the movement amount detection error. The own position estimator 20 can thereby reduce the extraction range A and reduce accumulation of odometry errors when the travel route includes points where the movement amount change is large and odometry errors tend to accumulate such as high-gradient sections and crossings involving right and left turns, stops, and starts.

In step S50, the own position estimator 20 extracts the pieces of landmark position data included in the extraction range A set in step S40, from the pieces of landmark position data accumulated in the landmark position accumulator 16. Then, the own position estimator 20 matches the extracted pieces of landmark position data with the landmark positions included in the map information and estimates the own position of the vehicle.

Specifically, the own position estimator 20 extracts the pieces of landmark position data in the extraction range A set in step S40, from the pieces of landmark position data on section lines, curbs, and the like accumulated in step S30. In this case, the own position estimator 20 adds up the movement amounts ΔL calculated in step S20 while going back from the current time point t, and extracts the pieces of landmark position data until the added-up value exceeds the extraction range A.

Then, the own position estimator 20 matches the extracted pieces of landmark position data with the landmark positions in the map information stored in the three-dimensional map database 3 and estimates the own position of the vehicle in the absolute coordinate system. Specifically, the own position estimator 20 estimates the position and attitude angle with a total of three degrees of freedom which include the position (X coordinate) of the vehicle in the east-west direction, the position (Y coordinate) of the vehicle in the north-south direction, and the azimuth angle θ (yaw angle θ) of the vehicle. When the own position is estimated as described above, the own position estimation processing according to the embodiment is terminated.

Note that ICP (Iterative Closest Point) algorithm is used in the matching in step S50. In this case, for example, a section line among the landmark positions included in the map information of the three-dimensional map database 3 is matched by using end points at both ends of the section line as evaluation points. Moreover, the closer a piece of the landmark position data is to the vehicle (camera 2), the less it is affected by the odometry error. Accordingly, the number of evaluation points is increased near the vehicle by performing linear interpolation while the number of evaluation points is reduced in an area far away from the vehicle.

Modified Example 1

As a modified example 1 of the embodiment, in the estimation of the movement amount detection error by using the travel records of the vehicle in step S40, when the number of right and left turns of the vehicle is large in a specific example of the travel records, the own position estimator 20 estimates that the movement amount detection error is large, and reduces the extraction range A. This is because the change in the past movement amount increases as the number of turn increases. In this case, the extraction range A is first set to 200 m, and the number of times the vehicle has made left and right turns at crossings in the extraction range A is counted by using the link-node information registered in the three-dimensional map database 3.

Figure 10:
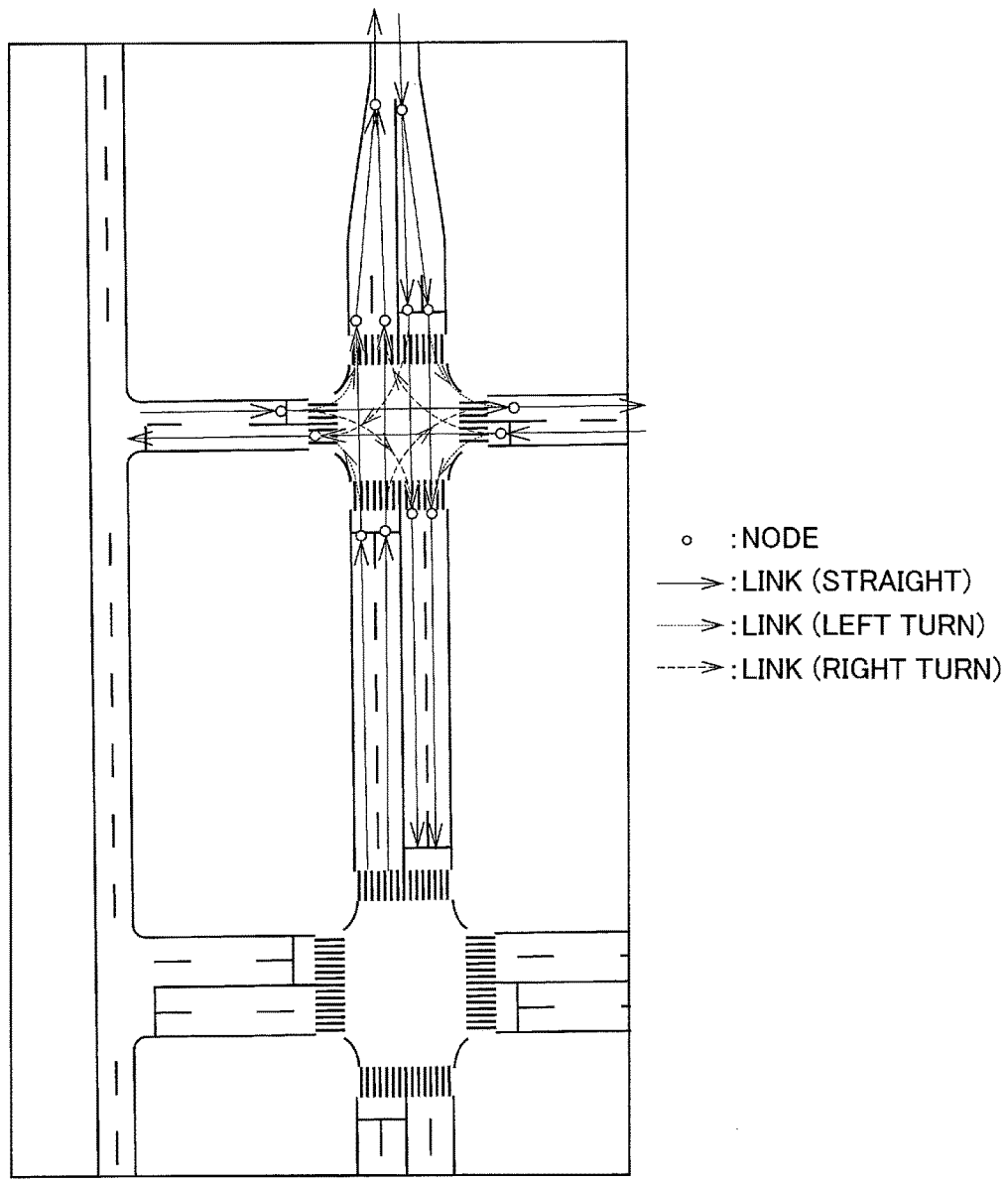
FIG. 10 is a view for explaining link-node information acquired by the own position estimation device according to the first embodiment of the present invention.
Figure 11A:
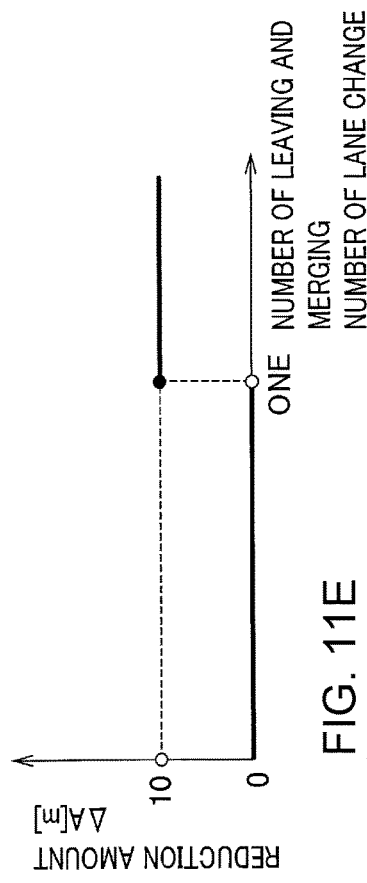
FIGS. 11A-11E are views for explaining a method of setting an extraction range by the own position estimation device according to a fifth modified example of the first embodiment of the present invention.
Figure 11B:
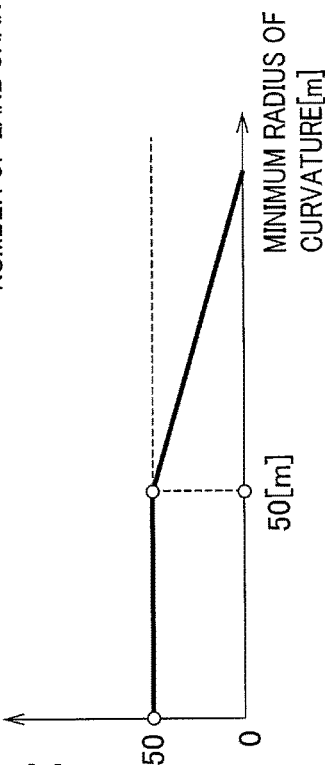
Figure 11C:
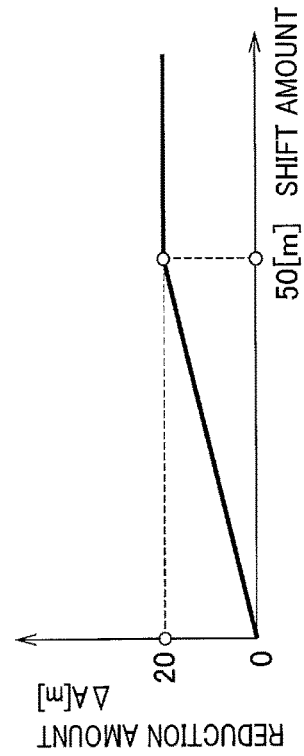
Figure 11D:
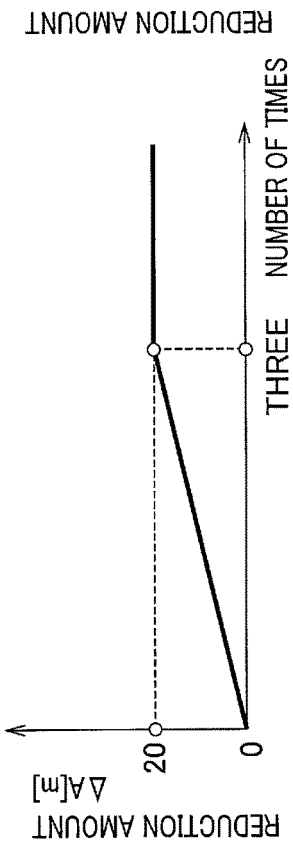
Figure 11E:
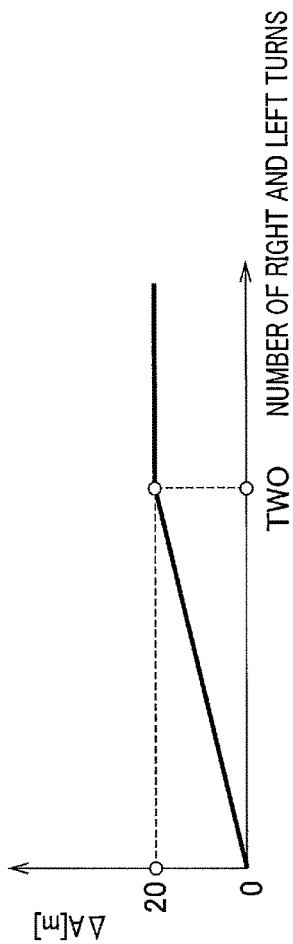

As illustrated in FIG. 10, in the link-node information, there are recorded divided links (arrows) and nodes (circles), and attribute information from which straight, right turn, left turn, merging, or leaving is determinable is assigned to each link. Accordingly, right and left turn information of the vehicle can be acquired by detecting links which the vehicle has passed and referring to the link-node information.

When the number of right and left turns at the crossings in the travel records is less than two, the change in the past movement amount is small and thus the own position estimator 20 estimates that the movement amount detection error is small, and sets the extraction range A to a large value, for example, leaves the extraction range A at 200 m. Meanwhile, when the number of right and left turns at the crossings in the travel records is two or more, the change in the past movement amount is large and thus the own position estimator 20 estimates that the movement amount detection error is large, and sets the extraction range A to a small value, for example, 100 m. In this case, the extraction range A can be continuously changed depending on the number of right and left turns.

As described above, when the vehicle performs right and left turns which tend to cause accumulation of odometry errors, the extraction range A is reduced to reduce the accumulation of odometry errors.

Modified Example 2

As a modified example 2, when the number of lane changes of the vehicle is large in a specific example of the travel records in step S40, the own position estimator 20 estimates that the movement amount detection error is large, and reduces the extraction range A. This is because the change in the past movement amount increases as the number of lane changes increases. In this case, the extraction range A is first set to 200 m, and the number of times the vehicle has made lane changes in the extraction range A is counted by using the link-node information registered in the three-dimensional map database 3. As illustrated in FIG. 10, in the link-node information, the link information is set individually for each lane in a road with multiple lanes. Accordingly, the number of lane changes can be counted by referring to the link-node information.

When the number of lane changes in the travel records is zero, the change in the past movement amount is small and thus the own position estimator 20 estimates that the movement amount detection error is small, and sets the extraction range A to a large value, for example, leaves the extraction range A at 200 m. Meanwhile, when the number of lane changes in the travel records is one or more, the change in the past movement amount is large and thus the own position estimator 20 estimates that the movement amount detection error is large, and sets the extraction range A to a small value, for example, 100 m.

As described above, when the vehicle performs lane changes which tend to cause accumulation of odometry errors, the extraction range A is reduced to reduce the accumulation of odometry errors.

Modified Example 3

As a modified example 3, when the number of leaving and merging of the vehicle is large in a specific example of the travel records in step S40, the own position estimator 20 estimates that the movement amount detection error is large, and reduces the extraction range A. This is because the change in the past movement amount increases as the number of leaving and merging increases. In this case, the extraction range A is first set to 200 m, and the number of times the vehicle has left a lane or merged into a lane in the extraction range A is counted by using the link-node information registered in the three-dimensional map database 3. Determination of leaving or merging can be made by referring to the attribute information assigned to each link in the link-node information as illustrated in FIG. 10. In FIG. 10, although the link of leaving or merging are not illustrated, since the attribute information from which straight, right turn, left turn, merging, or leaving is determinable is assigned to each link, whether the vehicle has left a lane or merged into a lane can be determined by referring to this attribute information.

When the number of leaving and merging in the travel records is zero, the change in the past movement amount is small and thus the own position estimator 20 estimates that the movement amount detection error is small, and sets the extraction range A to a large value, for example, leaves the extraction range A at 200 m. Meanwhile, when the number of leaving and merging in the travel records is one or more, the change in the past movement amount is large and thus the own position estimator 20 estimates that the movement amount detection error is large, and sets the extraction range A to a small value, for example, 180 m.

As described above, when the vehicle leaves a lane or merges into a lane which tends to cause accumulation of odometry errors, the extraction range A is reduced to reduce the accumulation of odometry errors.

Modified Example 4

As a modified example 4, when the radius of curvature of a curve through which the vehicle has traveled is small in a specific example of the travel records in step S40, the own position estimator 20 estimates that the movement amount detection error is large, and reduces the extraction range A. This is because the change in the past movement amount increases as the radius of curvature increases. In this case, the extraction range A is first set to 200 m, and the radius of curvature of a curve through which the vehicle has traveled in the extraction range A is detected by using the link-node information registered in the three-dimensional map database 3. Since the radius of curvature is stored in each link in the link-node information, the radius of curvature can be detected by specifying the link through which the vehicle has traveled.

Then, when the radius of curvature of the curve through which the vehicle has traveled in the travel records is more than 50 m, the change in the past movement amount is small and thus the own position estimator 20 estimates that the movement amount detection error is small, and sets the extraction range A to a large value, for example, leaves the extraction range A at 200 m. Meanwhile, when the radius of curvature of the curve through which the vehicle has traveled in the travel records is 50 m or less, the change in the past movement amount is large and thus the own position estimator 20 estimates that the movement amount detection error is large, and sets the extraction range A to a small value, for example, 100 m. In this case, the extraction range A can be continuously changed depending on the radius of curvature.

As described above, when the vehicle travels through a curve with a small radius of curvature which tends to cause accumulation of odometry errors, the extraction range A is reduced to reduce the accumulation of odometry errors.

Modified Example 5

As a modified example 5, the own position estimator 20 may estimate the change in the past movement amount, estimate the movement amount detection error, and set the extraction range A by using multiple forms of travel records in the aforementioned embodiment and the modified examples 1 to 4. In this case, as illustrated in FIGS. 11A-11E, a reduction amount $\Delta A$ of the extraction range A is set for each of the shift amount $\Delta y$ being the change in the past movement amount in the travel records and error factors such as the number of right and left turns which are assumed to cause a large change in the past movement amount. When the detection error for each error factor is estimated to be large, the reduction amount $\Delta A$ corresponding to this error factor is subtracted from the extraction range A. For example, in FIG. 11, the reduction amount $\Delta A$ is set to 20 m for each of the case where the shift amount $\Delta y$ in the travel records is 50 m or more, the case where the number of times passing the crossing is three or more, and the case where the number of right and left turns is two or more in the travel records, while the reduction $\Delta A$ is set to 10 m for the case where the number of leaving, merging, or lane changes is one or more. Moreover, the reduction amount $\Delta A$ is set to 50 m for the case where the radius of curvature of a curve through which the vehicle has travelled is 50 m or less in the travel records. Then, when there are multiple error factors estimated to cause a large movement amount detection error, the extraction range A is set by subtracting the sum of the reduction amounts $\Delta A$ corresponding to these error factors from 200 m set in advance. For example, when the number of right and left turns is two and the number of lane changes is one in the travel records, 30 m being the sum of the reduction amounts 20 m and 10 m for the respective error factors is subtracted from 200 m, and the extraction range A is set to 170 m. In this case, when the sum of the reduction amounts $\Delta A$ is too large, the extraction range A becomes too small and the matching executed in step S50 is difficult to perform. Accordingly, the minimum value of the extraction range A is set to, for example, 100 m. Moreover, each reduction amount $\Delta A$ is set to an appropriate value by studying a matching state in step S50 in advance through experiments and simulations.

(Effects of First Embodiment)

Figure 12B:
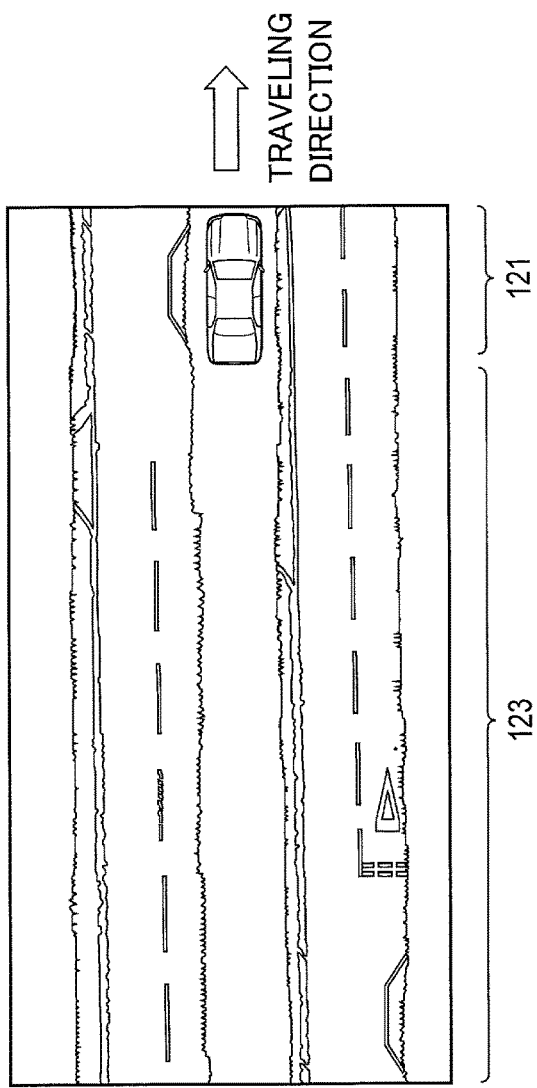
FIGS. 12A and 12B are views for explaining a conventional own position estimation technique.
Figure 12A:
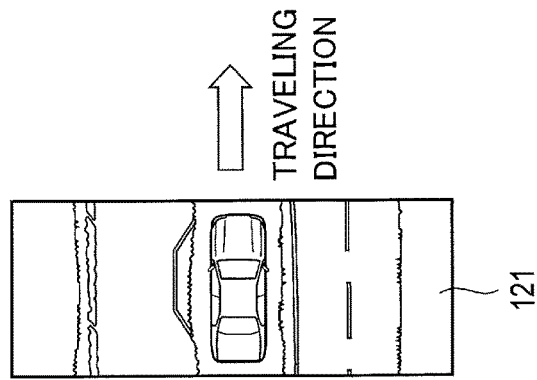

Next, effects of the own position estimation device in the embodiment are described. First, description of a conventional own position estimation technique is described. In the conventional technique, the movement amounts and the sensing results are accumulated and coupled to estimate the own position. For example, FIG. 12A illustrates a bird's eye view image acquired by converting images of fish-eye cameras configured to capture images of right and left sides of a vehicle in a downward direction. Although a current bird's eye view image 121 is small as illustrated in FIG. 12A, a past bird's eye view image of a fixed section can be acquired by adding a portion 123 to the current bird's eye view image 121 as illustrated in FIG. 12B, the portion 123 acquired by accumulating and coupling records of the past movement amounts and the sensing results (bird's eye view images). Accordingly, even when there is an obstacle such as a parked vehicle, the own position can be estimated by using the past sensing results.

In this case, in the conventional own position estimation technique, records of the sensing results within a fixed distance are always used to eliminate effects of the movement speed of the mobile body and stably perform the estimation of the own position. This is because, when the records of the sensing results within a fixed time are used, the sensing results acquired when the mobile body is traveling at extremely low speed or is stationary are the same as the current sensing results. Moreover, when the movement speed is high, a region acquired by coupling the records of the sensing results is large and a large computation load is required to perform adjustment of matching the sensing results with the map information.

However, since the conventional own position estimation technique described above uses the records of the sensing results within the fixed distance, this technique has a problem that, in a situation where the movement amount detection error is large, deviation between the sensing results and the map information is large and estimation of the own position is difficult.

Figure 13:
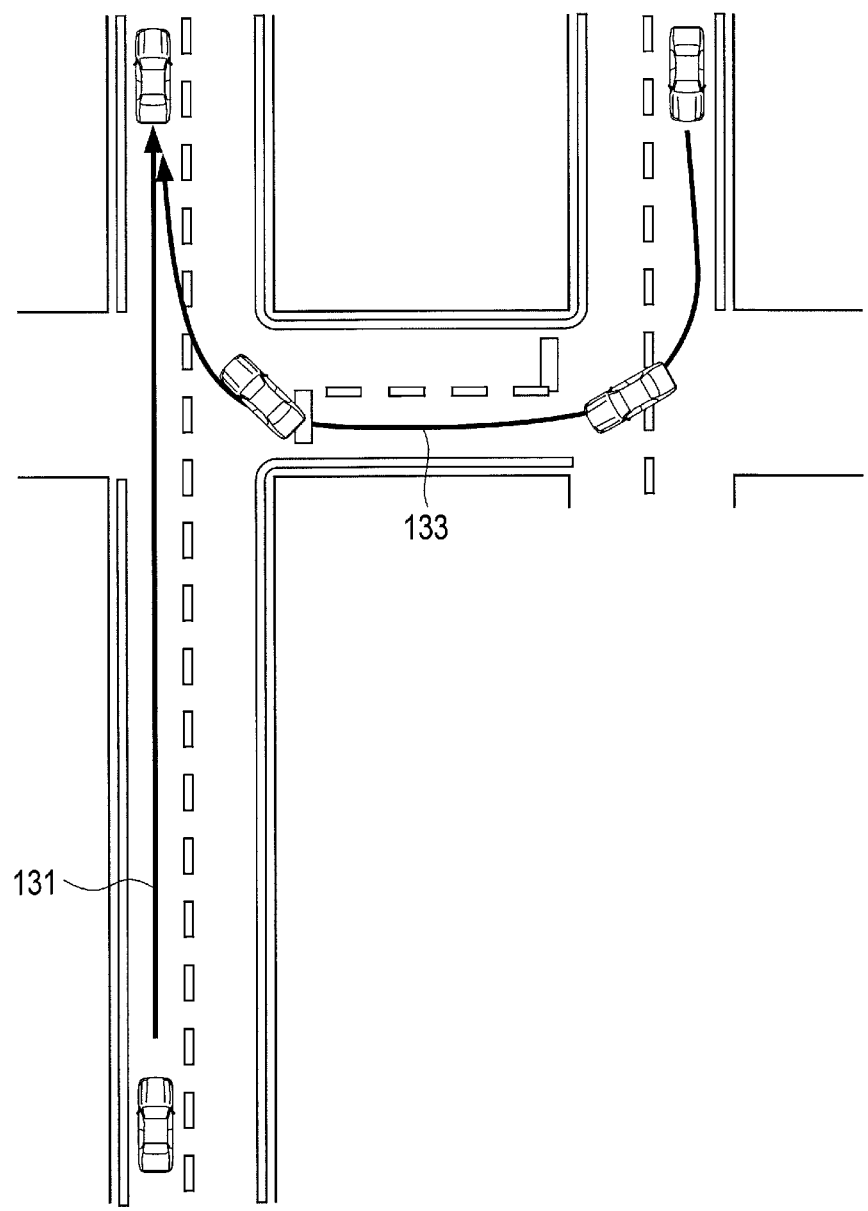
FIG. 13 is a view for explaining the conventional own position estimation technique.

For example, as illustrated in FIG. 13, a result of coupling the sensing results for the same distance is compared between a case 131 where the travel records of the vehicle indicate that the vehicle has traveled straight at a constant speed and a case 133 where the travel records of the vehicle indicate that the vehicle has repeatedly made right or left turns while accelerating and decelerating.

Figure 14B:
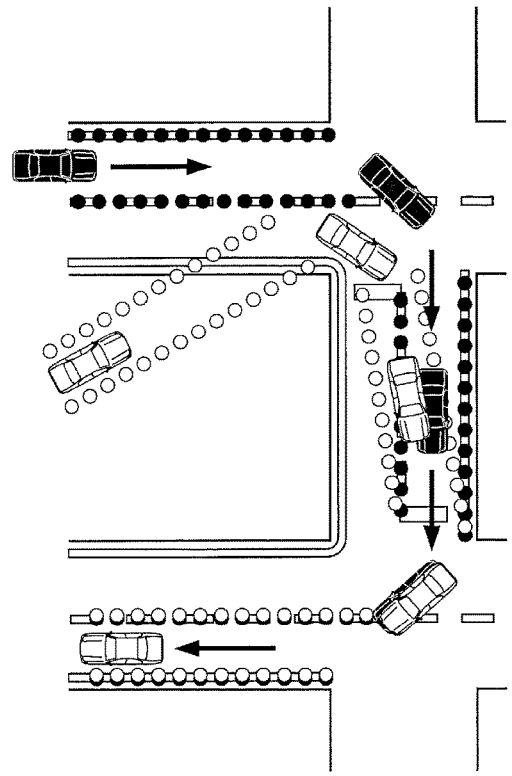
FIGS. 14A and 14B are views for explaining the conventional own position estimation technique.
Figure 14A:
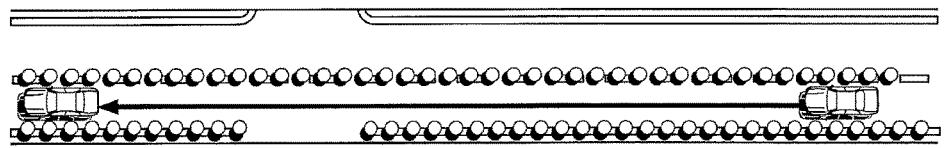

FIGS. 14A and 14B are views illustrating the comparison results. The black circles in FIGS. 14A and 14B indicate the positions of white line edges detected moment by moment by laser rangefinders mounted in the vehicle, and white circles indicates the result of coupling the past sensing results in the conventional own position estimation technique.

As illustrated in FIG. 14A, when the travel records of the vehicle indicate that the vehicle has traveled straight at a constant speed, the change in the past movement amount of the vehicle is small and thus the movement amount detection error is small. Accordingly, the deviation between the detected white line edges (black circles) and the coupled sensing results (white circles) is small.

On the other hand, as illustrated in FIG. 14B, when the travel records of the vehicle indicate that the vehicle has repeatedly made right or left turns while accelerating and decelerating, the change in the past movement amount of the vehicle is large and, as a result, the movement amount detection error is large. Accordingly, the deviation between the detected white line edges (black circles) and the coupled sensing results (white circles) becomes larger from the present toward the past. In such a case, it is conceivable to reduce the movement amount detection error by making a vehicle model used in the detection of the movement amount more accurate. However, in the case of, for example, a vehicle, it is difficult to accurately model a change in the coefficient of friction of the road surface and a change in the mass of the vehicle body due to changes in occupants and fuel on board, and the aforementioned problem is thus difficult to solve.

Figure 15:
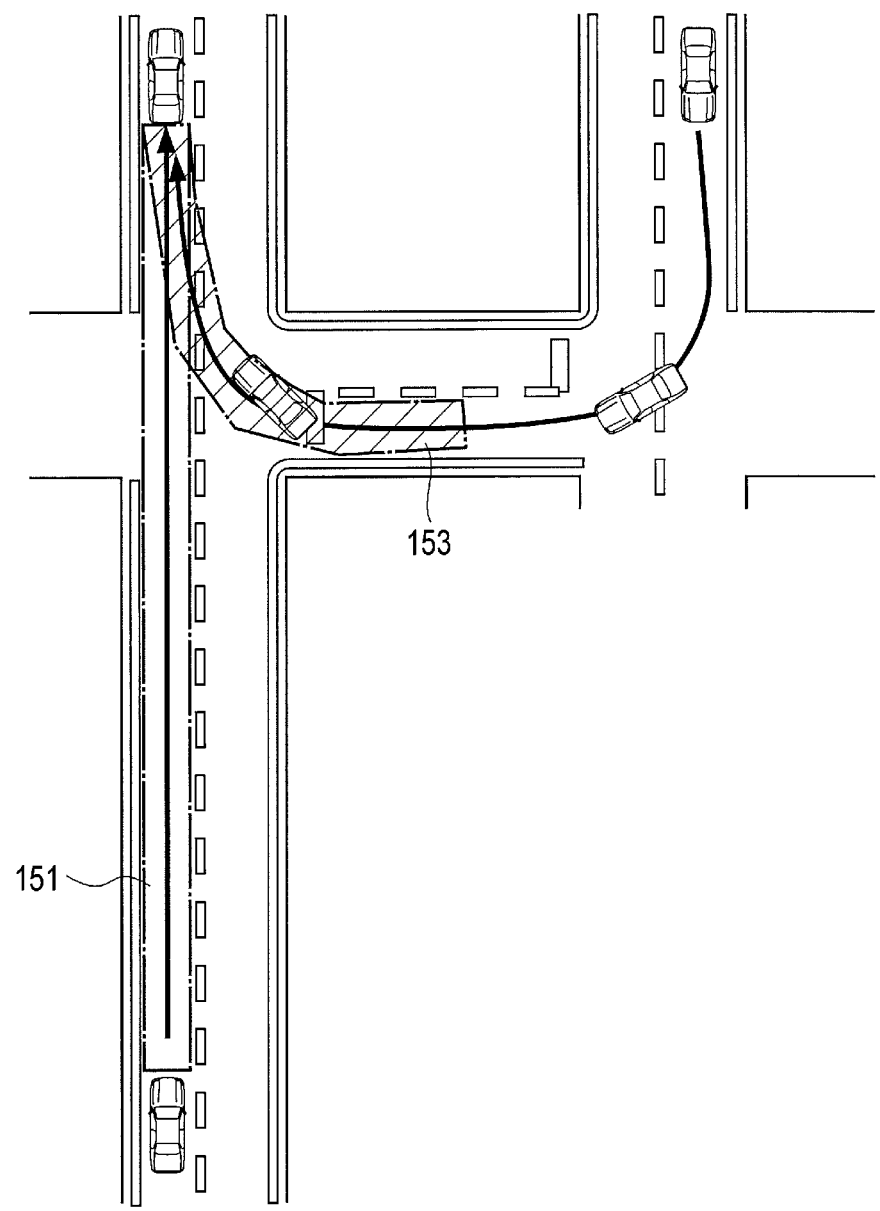
FIG. 15 is a view for explaining a method of setting the extraction range by the own position estimation device according to the first embodiment of the present invention.

Accordingly, the own position estimation device according to the embodiment estimates the movement amount detection error by using the travel records of the vehicle and reduces the data extraction range of the accumulated pieces of landmark position data as the estimated detection error increases. For example, as illustrated in FIG. 15, a large extraction range 151 is set when the vehicle has traveled straight, which causes a small movement amount detection error, and a small extraction range 153 is set when the vehicle has repeated right and left turns, which causes a large detection error.

As described above, the own position estimation device according to the embodiment sets the certain range (extraction range A) for the pieces of landmark position data, based on the travel records and estimates the own position of the vehicle by matching the extracted pieces of landmark position data in the certain range (extraction range A) with the landmark positions included in the map information. When the travel records indicate that the vehicle has repeatedly made right and left turns, the change in the past movement amount is large. Thus, the own position estimation device determines that the detection error is large, and reduces the certain range (extraction range A) such that the pieces of landmark position data can be matched with the landmark positions in the map information in a range in which the deviation from the map information is sufficiently small. Moreover, when the travel records indicate that the vehicle has traveled straight at constant speed, the change in the past movement amount is small. Thus, the own position estimation device determines that the detection error is small, and increases the certain range (extraction range A) such that more pieces of landmark position data can be matched with the landmark positions in the map information. Accordingly, the own position can be stably estimated with high accuracy based on the travel records not only in the situation where the movement amount detection error is small but also in the situation where the detection error is large.

Moreover, the own position estimation device according to the embodiment reduces the certain range as the number of right and left turns of the vehicle in the travel records increases. The right and left turns at crossings involve not only turning of the vehicle but also deceleration and acceleration before and after the turns, and the change in the past movement amount is thus large. Accordingly, the movement amount detection error in the front-rear direction of the vehicle body is large. Thus, when there are many right and left turns which tend to cause accumulation of the movement amount detection errors, the accumulation of the movement amount detection errors can be reduced by reducing the certain range (extraction range A), and this enables stable estimation of the own position with high accuracy.

Furthermore, the own position estimation device according to the embodiment reduces the certain range as the number of lane changes of the vehicle in the travel records increases. In the lane change of the vehicle, sideslip movement of the vehicle body which is non-linear and which involves a large change in the past movement amount occurs. Accordingly, the estimation of the movement amount with high accuracy is difficult and the movement amount detection error increases. Thus, when there are many lane changes which tend to cause accumulation of the movement amount detection errors, the accumulation of the movement amount detection errors can be reduced by reducing the certain range (extraction range A), and this enables stable estimation of the own position with high accuracy.

Moreover, the own position estimation device according to the embodiment reduces the certain range as the number of leaving and merging of the vehicle in the travel records increases. In the leaving and merging of the vehicle, the vehicle performs actions such as lane changes and turns which involve large change in the past movement amounts and which increase the movement amount detection error. Thus, when there are many leaving and merging which tend to cause accumulation of the movement amount detection errors, the accumulation of the movement amount detection errors can be reduced by reducing the certain range (extraction range A), and this enables stable estimation of the own position with high accuracy.

Furthermore, the own position estimation device according to the embodiment reduces the certain range as the radius of curvature of the curve through which the vehicle travels in the travel records decreases. When the vehicle travels through a tight curve at high vehicle speed, sideslip movement of the vehicle body which is non-linear and which involves a large change in the past movement amount occurs as in the lane change, and estimation of the movement amount with high accuracy thus becomes difficult. Thus, when the vehicle travels through a curve with a small radius of curvature which tends cause accumulation of the movement amount detection errors, the accumulation of the movement amount detection errors can be reduced by reducing the certain range (extraction range A), and this enables stable estimation of the own position with high accuracy.

Second Embodiment

Next, the own position estimation device according to the second embodiment of the present invention is described with reference to the drawings. Note that, since the configuration of the own position estimation device according to the embodiment is the same that of the first embodiment, detailed description thereof is omitted.

(Steps in Own Position Estimation Processing)

Figure 16:
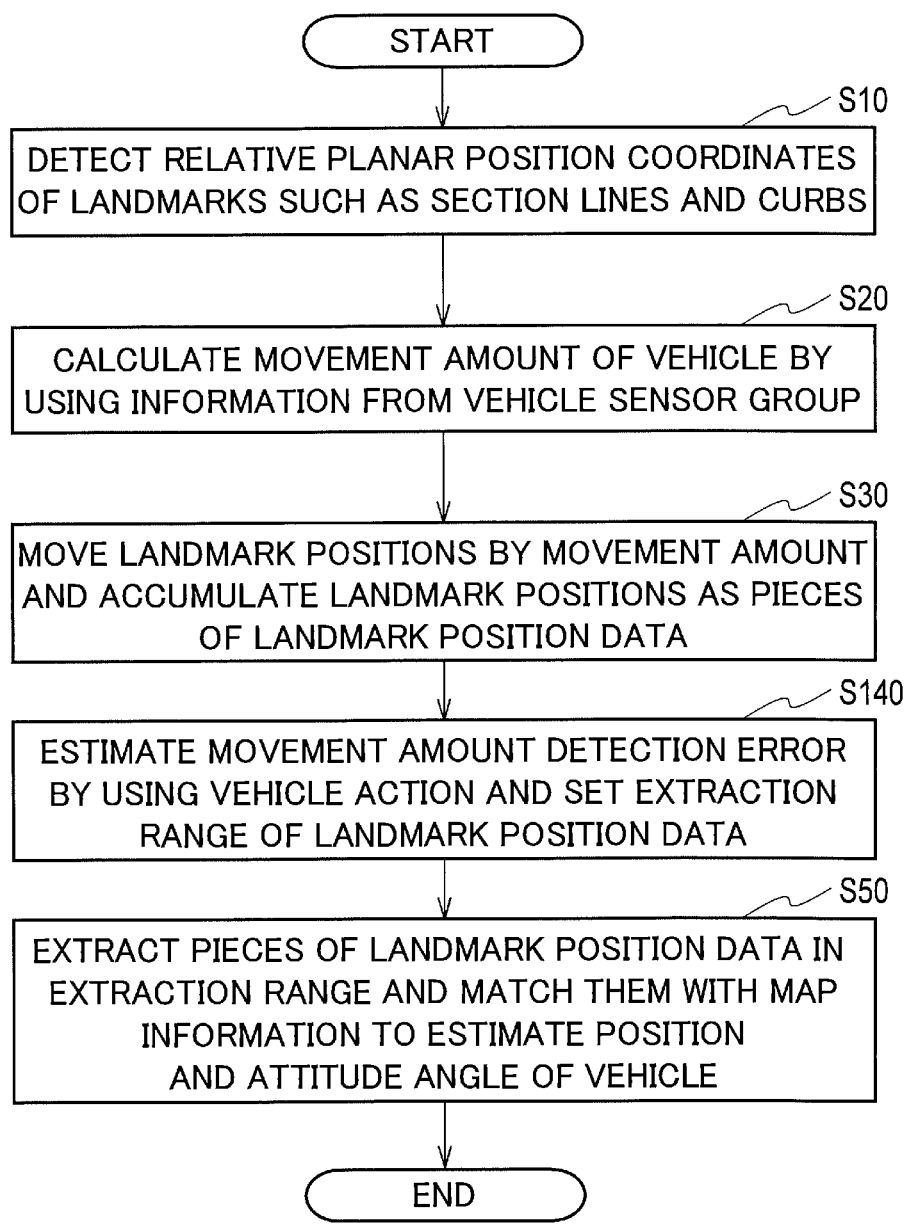
FIG. 16 is a flowchart illustrating processing steps in own position estimation processing by the own position estimation device according to a second embodiment of the present invention.

Steps in own position estimation processing according to the embodiment are described with reference to the flowchart of FIG. 16. In the first embodiment, the movement amount detection error is estimated in step S40 by using the travel records of the vehicle. However, this embodiment is different from the first embodiment in that, in step S140, the certain range (extraction range A) is set by focusing on vehicle actions in the travel records. Note that, since step S10 to S30 and step S50 are the same as those in FIG. 3 of the first embodiment, detailed description thereof is omitted.

In step S140, the own position estimator 20 estimates the movement amount detection error of the vehicle by using the travel records and sets the certain range (extraction range A) over which the pieces of landmark position data are to be extracted from the landmark position accumulator 16, based on the estimated movement amount detection error. Particularly, in the embodiment, the movement amount detection error is estimated by using the vehicle action which is the change in the past movement amount in the travel records. Specific examples of the vehicle actions used to estimate the movement amount detection error include a turn amount of the vehicle.

The own position estimator 20 calculates a difference between the attitude angle θ(t) of the vehicle calculated in the step S50 in the previous cycle and the attitude angle θ(t-T) of the vehicle the time T [s] before the current time point by using the travel records, and acquires a turn amount dθ [rad] which is the movement amount change. Then, when the absolute value of the turn amount dθ which is the change in the past movement amount is equal to or more than a threshold dθth, the own position estimator 20 can estimate that the movement amount detection error is large. Meanwhile, when the absolute value of the turn amount dθ which is the change in the past movement amount is smaller than the threshold dθth, the own position estimator 20 can estimate that the movement amount detection error is small. Note that the threshold dθth may be set to, for example, 1.745 [rad]≈100 [deg].

When the turn amount which is the movement amount change of the vehicle is large as described above, it is possible to assume that the vehicle has performed turning, lane changes, right or left turns, or travel along a curved road which tend to cause accumulation of odometry errors. Accordingly, the own position estimator 20 can estimate that the movement amount detection error is large.

When the own position estimator 20 estimates that the movement amount detection error is small by using the change in the past movement amount in the travel records, the own position estimator 20 increases the extraction range A [m] over which the pieces of landmark position data are to be extracted in step S50, and sets it to, for example, 200 m. Meanwhile, when the own position estimator 20 estimates that the movement amount detection error is large by using the change in the past movement amount in the travel records, the own position estimator 20 reduces the extraction range A [m] and sets it to, for example, 100 m. Moreover, the own position estimator 20 may change the extraction range A such that the extraction range A becomes continuously smaller as the turn amount being the change in the past movement amount in the travel records becomes larger. In other words, the extraction range A is set to become smaller as the movement amount detection error estimated by using the change in the past movement amount in the travel records becomes larger.

As described above, when the turn amount of the vehicle is large and the odometry errors tend to accumulate, the extraction range A is reduced to reduce the accumulation of odometry errors.

Moreover, the turn amount dθ may be acquired by integrating absolute values of yaw angle change amount Δθ(t) at respective moments in the last time T [s] up to the current time point t which are recorded in the travel records. In this method, the own position estimator 20 can detect that the actual turning amount is large even when the vehicle performs slalom driving or the like and the attitude angle seems to have returned to the original angle.

Moreover, the own position estimator 20 may detect, instead of the integrated value of the turn amounts, the maximum absolute value γabs [rad/s] of a turn rate (yaw rate) in the extraction range A and estimate that the movement amount detection error is large when γabs is more than a threshold γth [rad/s]. The threshold γth can be set to, for example, 0.39 [rad/s]≈20 [deg/s].

Modified Example 6

As a modified example 6, when the vehicle speed change of the vehicle which is a specific example of the vehicle action in step S140 is large, the own position estimator 20 estimates that the movement amount detection error is large, and reduces the extraction range A. In this case, the own position estimator 20 first sets the extraction range A to 200 m and detects the maximum absolute value αabs [m/s$^2$] of a measurement value α[m/s$^2$] of the acceleration sensor 46 configured to measure the acceleration of the vehicle in the front-rear direction.

Then, when αabs being the travel record is smaller than a threshold αth [m/s$^2$], the own position estimator 20 estimates that the movement amount detection error is small and sets the extraction range A to a large value, for example, leaves the extraction range A at 200 m. Meanwhile, when αabs being the travel record is equal to or more than the threshold αth, the own position estimator 20 estimates that the movement amount detection error is large and sets the extraction range A to a small value, for example, 100 m. The threshold αth may be set to, for example, 0.2 [m/s$^2$]. In this example, the extraction range A may be continuously changed depending on αabs.

As described above, when the vehicle changes the vehicle speed greatly which tends to cause accumulation of odometry errors, the extraction range A is reduced to reduce the accumulation of odometry errors.

Note that the own position estimator 20 may measure accelerations in the vehicle width direction and the up-down direction of the vehicle by using a multiaxis sensor as the acceleration sensor 46 and make determination based on a combined component of the accelerations. Furthermore, in step S140, the own position estimator 20 may determine whether the vehicle has performed, for example, right or left turn at a crossing, a lane change, or the like from the vehicle action and set the extraction range A in the method described in the first embodiment.

(Effects of Second Embodiment)

As described above in detail, the own position estimation device in the embodiment estimates that the larger the turn amount of the vehicle which is the past movement amount in the travel records is, the larger the movement amount detection error is, and reduces the certain range (extraction range A). When the vehicle turns, in addition to the movement amount detection error in the turning direction, the movement amount detection error in the vehicle width direction increases due to slipping of the tires. Thus, when the turn amount of the vehicle is large in the travel records which tends to cause accumulation of the movement amount detection errors, the accumulation of the movement amount detection errors can be reduced by reducing the certain range (extraction range A), and this enables stable estimation of the own position with high accuracy.

Moreover, the own position estimation device in the embodiment estimates that the larger the speed change of the vehicle is in the travel records, the larger the movement amount detection error is, and reduces the certain range (extraction range A). When the vehicle accelerates or decelerates, the change in the past movement amount is large and thus the movement amount detection error in the front-rear direction of the vehicle is large. Thus, when the vehicle speed change is large in the travel records which tends to cause accumulation of the movement amount detection errors, the accumulation of the movement amount detection errors can be reduced by reducing the certain range (extraction range A), and this enables stable estimation of the own position with high accuracy.

Note that the embodiments described above are examples of the present invention. The present invention is thus not limited by the above embodiments and, as a matter of course, modes other than the above embodiments can be carried out by making various changes depending on designs and the like within a scope not departing from the technical idea of the present invention.

Particularly, although examples using the vehicle are described in the above embodiment, the present invention can be applied to any mobile body such as an aircraft or a ship as long as the mobile body has a sensor for measuring the odometry and one or both of at least one camera and at least one laser rangefinder. Moreover, although the position and attitude angle of the vehicle with three degrees of freedom are acquired in the above embodiment, the position and attitude angles with six degrees of freedom can be estimated.

REFERENCE SIGNS LIST

1 ECU
2, 2a, 2b camera
3 three-dimensional map database
4 vehicle sensor group
5, 5a, 5b laser rangefinder
10 own position estimation device
12 landmark position detector
14 movement amount detector
16 landmark position accumulator
18 map information acquirer
20 own position estimator
41 GPS receiver
42 accelerator sensor
43 steering sensor
44 brake sensor
45 vehicle speed sensor
46 acceleration sensor
47 wheel speed sensor
48 yaw rate sensor

The invention claimed is:

1. An own position estimation device configured to estimate an own position of a mobile body, the own position estimation device comprising:
a landmark position detector configured to detect a relative position of a landmark existing around the mobile body with respect to the mobile body;
a movement amount detector configured to detect a movement amount of the mobile body;
a landmark position accumulator configured to accumulate, as landmark position data of the landmark with respect to the mobile body, a relative position obtained by moving the relative landmark position of the landmark with respect to the mobile body detected by the landmark position detector, by the movement amount detected by the movement amount detector;
a map information acquirer configured to acquire map information including landmark positions of landmarks existing on a map; and
an own position estimator configured to match the accumulated landmark position data in a certain range with the landmark positions included in the map information and estimate the own position of the mobile body, the certain range being set based on an error factor in movement records of the mobile body obtained when the mobile body moves to a current position.

2. The own position estimation device according to claim 1, wherein the own position estimator reduces the certain range as a change in a past movement amount of the mobile body in the movement records increases.

3. The own position estimation device according claim 1, wherein
the mobile body is a vehicle, and
the own position estimator reduces the certain range as a number of right and left turns of the vehicle in the movement records increases.

4. The own position estimation device according to claim 1, wherein
the mobile body is a vehicle, and
the own position estimator reduces the certain range as a number of lane changes of the vehicle in the movement records increases.

5. The own position estimation device according to claim 1, wherein
the mobile body is a vehicle, and
the own position estimator reduces the certain range as a number of leaving and merging of the vehicle in a lane on a road in the movement records increases.

6. The own position estimation device according to claim 1, wherein
the mobile body is a vehicle, and
the own position estimator reduces the certain range as a radius of curvature of a curve through which the vehicle has traveled in the movement records decreases.

7. The own position estimation device according to claim 1, wherein
the own position estimator reduces the certain range as a turn amount of the mobile body in the movement records increases.

8. The own position estimation device according to claim 1, wherein the own position estimation device reduces the certain range as a movement speed change of the mobile body in the movement records increases.

9. An own position estimation method of estimating an own position of a mobile body, the own position estimation method comprising:

detecting, by a controller mounted in the mobile body, a relative position of a landmark existing around the mobile body with respect to the mobile body by a controller mounted in the mobile body;

detecting, by the controller, a movement amount of the mobile body by the controller;

accumulating, by the controller, as landmark position data of the landmark with respect to the mobile body, a relative position obtained by moving the detected relative position of the landmark with respect to the mobile body by the detected movement amount by the controller;

acquiring map information including landmark positions of landmarks existing on a map by the controller; and matching the accumulated landmark position data in a certain range with the landmark positions included in the map information and estimating the own position of the mobile body by the controller, the certain range being set based on an error factor in movement records of the mobile body obtained when the mobile body moves to a current position.

* * * * *